Dec. 16, 1952

D. Z. MURPHY 2,621,916

CRUCIBLE OR MELTING POT

Filed Dec. 19, 1949

INVENTOR.
David Z. Murphy
BY
Cook and Schermerhorn
ATTORNEYS

Patented Dec. 16, 1952

2,621,916

UNITED STATES PATENT OFFICE 2,621,916

CRUCIBLE OR MELTING POT

David Z. Murphy, Portland, Oreg., assignor of forty-five per cent to William L. Wilbert, Seaside, Oreg.

Application December 19, 1949, Serial No. 133,706

2 Claims. (Cl. 266—37)

1

This invention relates to an improved form of crucible or melting pot and has particular reference to crucibles or pots for melting any nonferrous metal for the making of high quality castings from molten metal free of gases and other impurities.

In the casting of small aluminum aritcles, for example, it is customary to melt the aluminum in a melting pot or crucible, and then to transfer the molten metal from the pot or crucible to the molds by means of a hand ladle. In this process it is difficult with a conventional crucible to reject the dross where the source material is scrap metal which has not been thoroughly cleaned. Such impurities are always undesirable in a casting, and particularly so in the casting of articles which are intended to present an attractive appearance.

The general object of the invention is, therefore, to provide an improved form of melting pot or crucible which will separate gases and other dross from the molten metal so that a supply of pure metal is available for casting purposes. A more particular object is to provide a crucible or melting pot having a ladling chamber separated from the melting chamber and supplied by the pure molten metal from the melting chamber below the level of the floating impurities. A further object is to provide a melting pot or crucible having a melting compartment and a ladling compartment with an interconnecting passage forming a trap to prevent dross and other impurities from flowing into the ladling chamber, regardless of the level of the molten metal.

In the preferred embodiment, the crucible is of elongated shape and equipped with a transverse partition to define a melting chamber in one end and a ladling chamber in the other end. The partition is equipped with a vertical passage extending from adjacent the bottom of the melting chamber to convey molten metal into the ladling chamber, the passage forming a trap to exclude floating dross. The dross is thereby retained in the melting chamber so that only the pure metal passes over to the ladling chamber. The term ladling chamber is intended to apply to any such chamber or compartment from which the pure metal is to be removed, even though it may be removed by some means other than a ladle.

These and other objects will be apparent and the invention will be better understood from the following specification with reference to the accompanying drawings illustrating the preferred embodiment of the invention.

2

Figure 1:
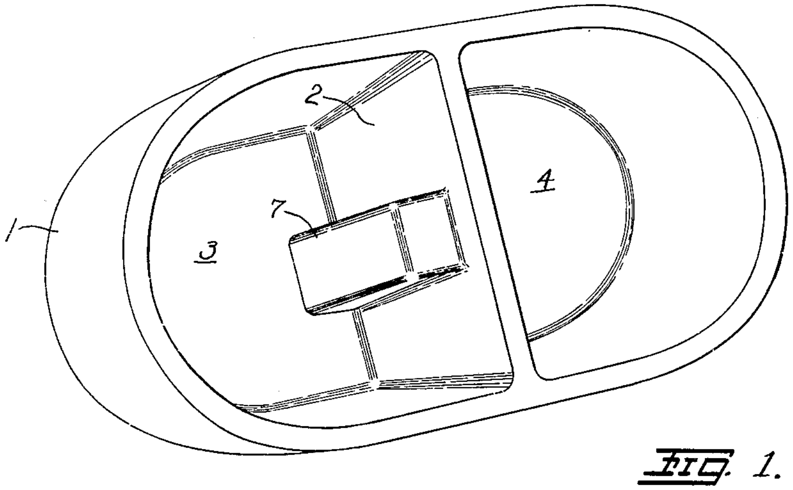
Figure 1 is a perspective view looking into the top of the crucible.
Figure 2:
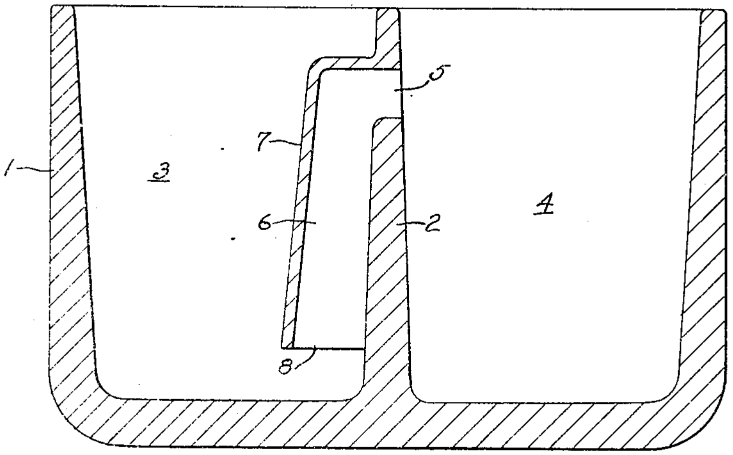
Figure 2 is a longitudinal sectional view of the crucible.

The crucible, indicated generally by the numeral 1, is elongated in shape and provided with a transverse partition 2 forming in one end of the crucible a melting chamber 3 and in the other end a ladling chamber 4. The bottom of the crucible and the lower parts of the partition and side walls are thickened, as shown in Figure 2, to distribute the heat effectively to all parts of the molten contents in both chambers when heat is applied to the bottom.

The partition 2 is provided with an opening 5 which constitutes the outlet opening at one end of an interconnecting passage 6 extending vertically down the side of the partition 2 within the melting chamber. The passage 6 is defined by an enclosing box-like wall 7 integral with the partition 2 and terminating just above the bottom of the melting chamber 3 to provide an inlet opening 8. The enclosing wall 7 of the passage 6 thereby forms a trap to prevent a surface flow from molten metal in the melting chamber 3 into ladling chamber 4. All the metal passing over into the ladling chamber must come from the very bottom of the melting chamber.

In the use of the crucible, pieces of the desired kind of metal are placed in the melting chamber 3, some of which pieces may be coated to some extent with scale, grease, dirt and other undesirable impurities. The amount of dross increases with the amount of metal that has been melted. When the crucible is first charged and only sufficient metal has melted to just submerge the inlet opening 8 very little dross will have formed and only a small fraction of that will have entered the opening 8. Thereafter, as more metal melts, the level of molten metal rises in the melting chamber carrying the dross up to higher levels and leaving the pure metal at the bottom. When the molten metal rises above the lower edge of opening 5 it flows over into the ladling chamber. Regardless of the amount of dross formed in the melting chamber 3, the ladling chamber 4 is always supplied with pure, clean metal from the very bottom of the melting chamber.

Hence, with the present crucible it is not necessary to clean the source material of all scale and dirt to insure that these impurities will not be poured into the castings. Such impurities segregate themselves in the dross which floats on the surface of the molten metal in the melting chamber and are rejected by the trap wall 7 so that they cannot flow over into the ladling chamber. This advantage is of considerable importance where the scrap metal constituting the source material is of such shapes that it is difficult to clean.

Obviously, the passage 6 and walls 7 may take other forms to carry out the intended function of forming a trap to reject the dross and convey to the ladling chamber only pure metal from the bottom of the melting chamber.

Having now described my invention and in what manner the same may be used, what I claim as new and desire to protect by Letters Patent is:

1. A crucible having side and end walls and a bottom, a partition wall in said crucible, said partition, side walls, end walls and bottom forming a melting chamber in one end of said crucible and a ladling chamber in the other end of said crucible, an opening extending through the upper portion of said partition, a wall integral with said partition extending vertically down the side of said partition and defining a passage within the melting chamber, said passage interconnecting said opening and the lower portion of said melting chamber and preventing surface flow from the melting chamber to the ladling chamber, the bottom of the crucible and lower portions of the walls and partition being thickened and the walls and partition being of diminishing thickness from the bottom to their upper edges for distributing heat to all portions of the contents of both chambers when heat is applied to the bottom.

2. A crucible having walls, a bottom and a transverse partition forming a melting chamber on one side of said partition and a ladling chamber on the other side of said partition, a vertical wall integral with said partition defining a passage extending from adjacent the bottom of the melting chamber, an opening through said partition providing communication between said passage and the upper portion of said ladling chamber, said last named wall preventing surface flow from the melting chamber to the ladling chamber, the bottom and lower portions of the walls and partition being thickened for distributing heat to all portions of the contents of both chambers when heat is applied to the bottom.

DAVID Z. MURPHY.

REFERENCES CITED

The following references are of record in the file of this patent:

UNITED STATES PATENTS

| Number | Name | Date |
|---|---|---|
| 307,845 | Curtis | Nov. 11, 1884 |
| 463,514 | Keiper | Nov. 17, 1891 |
| 558,647 | Iles | Apr. 21, 1896 |
| 1,344,688 | Griner | June 29, 1920 |
| 1,399,532 | Whiting | Dec. 6, 1921 |
| 1,672,728 | Otis | June 5, 1928 |
| 1,715,678 | Schneider | June 4, 1929 |
| 1,995,593 | Wefelscheid | Mar. 26, 1935 |
| 2,054,922 | Betterton et al. | Sept. 22, 1936 |
| 2,464,714 | Petersen | Mar. 15, 1949 |

FOREIGN PATENTS

| Number | Country | Date |
|---|---|---|
| 84,297 | Germany | Dec. 7, 1895 |